United States Patent
Knight et al.

(10) Patent No.: US 8,924,289 B1
(45) Date of Patent: Dec. 30, 2014

(54) INTERNATIONAL BANKING SYSTEM AND METHOD

(71) Applicant: JPMorgan Chase Bank, N.A., New York, NY (US)

(72) Inventors: Nigel Knight, Ringwood (GB); Richard Baker, Farmham (GB); Mel Metherell, Fleet (GB); Ian Chittick, Billericay (GB); Richard Parkin, Rugby (GB); Sang Leong, New Jersey, NJ (US); Les Green, Bournemouth (GB); Marc A. Anders, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/743,670

(22) Filed: Jan. 17, 2013

Related U.S. Application Data

(62) Division of application No. 12/883,324, filed on Sep. 16, 2010, now Pat. No. 8,380,597, which is a division of application No. 09/779,950, filed on Feb. 9, 2001, now Pat. No. 7,822,656.

(60) Provisional application No. 60/182,469, filed on Feb. 15, 2000.

(51) Int. Cl.
*G06Q 40/00* (2012.01)
*G06Q 40/02* (2012.01)
G06Q 20/00 (2012.01)
G06Q 30/04 (2012.01)

(52) U.S. Cl.
CPC ............... *G06Q 40/02* (2013.01); *G06Q 20/00* (2013.01); *G06Q 30/04* (2013.01); *G06Q 40/00* (2013.01)
USPC .................. 705/40; 705/35; 705/39; 705/44; 235/379

(58) Field of Classification Search
CPC ....... G06Q 40/00; G06Q 40/02; G06Q 20/00; G06Q 30/04
USPC .............. 705/14.53, 35, 39, 40, 44; 235/379
See application file for complete search history.

(56) References Cited

U.S. PATENT DOCUMENTS

| 2,005,003 A | 6/1935 | Patton et al. |
| 3,653,480 A | 4/1972 | Yamamoto et al. |

(Continued)

FOREIGN PATENT DOCUMENTS

| EP | 0099999 | 7/1983 |
| EP | 421808 | 4/1991 |

(Continued)

OTHER PUBLICATIONS

Unknown, ABA Banking Journal; The front end and back end functions of item processing will benefit from the technological advances of imaging; Mar. 1990; acs01038997.

(Continued)

*Primary Examiner* — Daniel Felten
(74) *Attorney, Agent, or Firm* — Hunton & Williams LLP

(57) ABSTRACT

A system and method for providing banks with access to a previously inaccessible existing international infrastructure. A provider bank first establishes on its system, a set of accounts for each of the customers of a client bank. The client bank environment has its own Demand Deposit Account (DDA) module to process account entries and calculate interest and its own funds transfer module to initiate and to receive funds transfers. The primary interface into the funds transfer section in the client bank environment is to the funds transfer section of the provider bank environment. The funds transfer section of the provider bank is coupled to the systems which constitute the international banking infrastructure that is able to process banking transactions on a global basis for the customers of the client bank.

11 Claims, 8 Drawing Sheets

(56) References Cited

U.S. PATENT DOCUMENTS

| | | |
|---|---|---|
| 3,938,090 A | 2/1976 | Borison et al. |
| 4,050,375 A | 9/1977 | Orleans |
| 4,141,078 A | 2/1979 | Bridges et al. |
| 4,205,780 A | 6/1980 | Burns |
| 4,264,808 A | 4/1981 | Owens et al. |
| 4,321,672 A | 3/1982 | Braun et al. |
| 4,385,285 A | 5/1983 | Horst et al. |
| 4,396,985 A | 8/1983 | Ohara |
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers |
| 4,650,981 A | 3/1987 | Foletta |
| 4,669,730 A | 6/1987 | Small |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian, Jr. |
| 4,701,601 A | 10/1987 | Francini et al. |
| 4,713,761 A | 12/1987 | Sharpe et al. |
| 4,752,676 A | 6/1988 | Leonard et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,817,949 A | 4/1989 | Bachman et al. |
| 4,823,264 A | 4/1989 | Derning |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,007,084 A | 4/1991 | Materna et al. |
| 5,023,904 A | 6/1991 | Kaplan |
| 5,025,139 A | 6/1991 | Halliburton, Jr. |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara et al. |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remonel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | VanHorn |
| 5,373,550 A | 12/1994 | Campbell |
| 5,382,784 A | 1/1995 | Eberhardt |
| 5,396,417 A | 3/1995 | Burks |
| 5,402,474 A | 3/1995 | Miller |
| 5,412,190 A | 5/1995 | Kopesec |
| 5,413,341 A | 5/1995 | Lieberman |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hil et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |

(56) References Cited

U.S. PATENT DOCUMENTS

| | | |
|---|---|---|
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Cornesanas |
| 5,802,499 A | 9/1998 | Sampson et al. |
| 5,819,236 A | 10/1998 | Josephson |
| 5,819,238 A | 10/1998 | Fernholz |
| 5,825,003 A | 10/1998 | Jennings et al. |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,377 A | 3/1999 | Chapin, Jr. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,878 A | 5/1999 | Talati et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kulling et al. |
| 5,928,082 A | 7/1999 | Clapper, Jr. |
| 5,930,778 A | 7/1999 | Goer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,659 A | 10/1999 | Cahill et al. |
| 5,963,925 A | 10/1999 | Kolling et al. |
| 5,966,698 A | 10/1999 | Pollin |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin et al. |
| 5,991,749 A | 11/1999 | Morrill, Jr. |
| 5,991,750 A | 11/1999 | Watson |
| 6,000,832 A | 12/1999 | Franklin et al. |
| 6,002,767 A | 12/1999 | Kramer |
| 6,003,762 A | 12/1999 | Hayashida |
| 6,006,205 A | 12/1999 | Loeb et al. |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,029,141 A | 2/2000 | Bezos et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,048,271 A | 4/2000 | Barcelou |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmermann et al. |
| 6,098,053 A | 8/2000 | Slater |
| 6,098,070 A | 8/2000 | Maxwell |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,108,641 A | 8/2000 | Kenna et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |

(56) References Cited

U.S. PATENT DOCUMENTS

| | | |
|---|---|---|
| 6,138,917 A | 10/2000 | Chapin, Jr. |
| 6,141,666 A | 10/2000 | Tobin |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,182,059 B1 | 1/2001 | Angotti et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,243,689 B1 | 6/2001 | Norton |
| 6,267,292 B1 | 7/2001 | Walker et al. |
| 6,278,981 B1 | 8/2001 | Dembo et al. |
| 6,278,996 B1 | 8/2001 | Richardson et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,349,290 B1 | 2/2002 | Horowitz et al. |
| 6,349,972 B1 | 2/2002 | Geiger et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,409,593 B1 | 6/2002 | Petrecca |
| 6,411,942 B1 | 6/2002 | Fujimoto |
| 6,411,947 B1 | 6/2002 | Rice et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,454,647 B1 | 9/2002 | Woodbury, Jr. |
| 6,456,981 B1 | 9/2002 | Dejaeger et al. |
| 6,460,020 B1 | 10/2002 | Pool et al. |
| 6,464,134 B1 | 10/2002 | Page |
| 6,485,922 B1 | 11/2002 | Erickson et al. |
| 6,490,568 B1 | 12/2002 | Omara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,942,569 B2 | 9/2005 | Petrecca |
| 6,954,896 B1 | 10/2005 | Dodrill et al. |
| 6,961,710 B1 | 11/2005 | Yanagisawa et al. |
| 6,965,882 B1 | 11/2005 | Lapstun et al. |
| 6,968,319 B1 | 11/2005 | Remington et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,938 B1 | 2/2006 | Libman |
| 6,999,943 B1 | 2/2006 | Johnson et al. |
| 7,004,382 B2 | 2/2006 | Sandru |
| 7,014,110 B2 | 3/2006 | Minowa et al. |
| 7,024,385 B1 | 4/2006 | Adcock et al. |
| 7,039,600 B1 | 5/2006 | Meek et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,146,344 B2 | 12/2006 | Wankmueller |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Biship et al. |
| 7,546,272 B2 | 6/2009 | Loy |
| 7,587,363 B2 | 9/2009 | Cataline et al. |
| 7,822,656 B2 | 10/2010 | Knight et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnett, Jr. |
| 2001/0034663 A1 | 10/2001 | Teveler et al. |
| 2001/0034682 A1 | 10/2001 | Knight et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0012446 A1 | 1/2002 | Tanaka |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0032651 A1 | 3/2002 | Embrey |

(56) References Cited

U.S. PATENT DOCUMENTS

| | | |
|---|---|---|
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0116331 A1 | 8/2002 | Cataline et al. |
| 2002/0128981 A1 | 9/2002 | Kawan et al. |
| 2002/0133461 A1 | 9/2002 | Ramachandran |
| 2002/0138390 A1 | 9/2002 | May |
| 2002/0138398 A1 | 9/2002 | Kalin et al. |
| 2002/0145039 A1 | 10/2002 | Carroll |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0014363 A1 | 1/2003 | Sethi |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040927 A1 | 2/2003 | Sato et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0213843 A1 | 11/2003 | Jackson |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0049451 A1 | 3/2004 | Berardi |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0158522 A1 | 8/2004 | Brown et al. |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236647 A1 | 11/2004 | Acharya |
| 2004/0236688 A1 | 11/2004 | Bozeman |
| 2004/0239481 A1 | 12/2004 | Beenau |
| 2004/0242308 A1 | 12/2004 | Gray |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0114264 A1 | 5/2005 | Torget et al. |
| 2005/0114883 A1 | 5/2005 | Nagai et al. |
| 2005/0116024 A1 | 6/2005 | Beenau et al. |
| 2005/0144059 A1 | 6/2005 | Schuessler |
| 2005/0167488 A1 | 8/2005 | Higgins et al. |
| 2005/0171898 A1 | 8/2005 | Bishop et al. |
| 2005/0177480 A1 | 8/2005 | Huang |
| 2005/0179251 A1 | 8/2005 | Wagoner et al. |
| 2005/0189427 A1 | 9/2005 | Brown et al. |
| 2005/0209954 A1 | 9/2005 | Asher et al. |
| 2005/0216888 A1 | 9/2005 | Drummond et al. |
| 2005/0228751 A1 | 10/2005 | Keown et al. |
| 2005/0261955 A1 | 11/2005 | Humble et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0027799 A1 | 2/2007 | Manelis et al. |
| 2007/0055625 A1 | 3/2007 | Sheehan et al. |
| 2007/0138255 A1 | 6/2007 | Carreon et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0193008 A1 | 8/2008 | Mount et al. |
| 2009/0043651 A1 | 2/2009 | Schwarz |

FOREIGN PATENT DOCUMENTS

| | | |
|---|---|---|
| EP | 0665486 | 8/1995 |
| EP | 1014318 | 6/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |

(56) References Cited

FOREIGN PATENT DOCUMENTS

| WO | WO 9745796 | 12/1997 |
|---|---|---|
| WO | WO 9745814 | 12/1997 |
| WO | WO 98/09260 | 3/1998 |
| WO | WO 9910823 | 3/1999 |
| WO | WO 99-49404 | 9/1999 |
| WO | WO 00/39979 | 7/2000 |
| WO | WO 01/75730 A2 | 10/2001 |
| WO | WO 02/063432 | 8/2002 |
| WO | WO 2004/079603 | 9/2004 |

OTHER PUBLICATIONS

Arend, Mark; Bank applications fuel optical storage market; ABA Banking Journal; Oct. 1991; acs01039000.
Unknown, Alabama department of revenue selects Unisys for imaging solution to speed tax returns, save taxpayers money; Sep. 6, 1995; acs01039064.
Hunt, Robert M., An Introduction to the Economics of Payment Card Networks; Jun. 2003.
Unknown, BancTec selects alchemy CD-Based archival solution for remittance processing system; May 6, 1998; acs01039047.
Keeton, Ann, Bank of America completes its rollout of 'paperless' processing of payments; Nov. 1, 1999; acs01039334.
Stanley, Susan et al., Bank of America provides nationwide image lockbox services; Oct. 20, 1999; acs01039405.
Business Wire; 1A Corp. wins contract with comerica to install the first digital all items archive, one of nation's top 25 bank holding companies expects to streamline operations . . . ; Jan. 9, 1997; acs01039033.
Business Wire; IA Corp. shows complex transaction processing software Work vision at AIIM, plus Check Vision and Remit Vision application frameworks for new advanced banking services . . . ; Apr. 14, 1997; acs01039025.
Business Wire; Shawnut bank provides lockbox customers real-time, on-line electronic exception processing, 1A Corp's image-based lockbox system cuts processing time from days to minutes . . . ; Jan. 9, 1996; acs01039031.
Unknown, Business Wire; State of Minnesota using AT&T imaging solution . . . ; Apr. 18, 1994; acs01039027.
Unknown, Caere introduces the Model 1800 document remittance processor; compact unit provides cost effective means for low to medium speed document processing; Oct. 19, 1995; acs01039057.
Malyykhina, Elena, Cell Phone Software Formats Checks for Online Banking, Jan. 24, 2008.
Lupo, Lisa Selkin, Chase image-enables NY wholesale lockbox facility with VICOR technology; Aug. 31, 1999; acs01039406.
Anonymous, Chase offers image lockbox for Europe; Aug. 1997; acs01039336.
Unknown, Crestar to introduce new advanced cash management system based on IA Corp. software; New system will be industry's first, . . . ; Oct. 28, 1996; acs01039059.
Unknown, DMP and IMR Partner to develop electronic archiving solution for wholesale Lockboxes and remittance processing; Mar. 24, 1998; acs01039040.
Matyas, Stephen M., Digital Signatures—An Overview; pp. 87-94; 1979.
Friis, M. William; Goodbye to paper?; ABA Banking Journal, Mar. 1989; acs01037874.
Unknown, IA Corp. announces new CheckVision products; new CheckVision archive software supports short; Apr. 1, 1996; acs01039339.
Unknown, IA Corporation becomes a major player in image-based cash management solutions; Nov. 24, 1995; acs01039052.
Unknown, IA announces installation at QuestPoint of first client/server cash management system with check image storage compatible with IBM, NCR and Unisys; May 29, 1997; acs01039044.
Unknown, IA presents new advanced cash management software at TMA to link banks and their corporate customers; full suite of cash management products allow banks to offer treasury . . . ; Nov. 18, 1996; acs01039049.
Unknown, IA's remit vision adopted by Harris Bank for CD-ROM and online customer viewing of check and remittance documents; continues banking industry trends to use image-based processing as strategic weapon . . . ; May 28, 1996; acs01039042.
IEM Product Description; ACS01066106.
Fitch, Thomas P., Image technology brings lockbox breakthroughs; Sep. 1995; acs01039344.
Andersen Consulting, Image-based transaction processing; The banking industry's challenge for the 1990s and beyond; 1989; acs01039270.
Tauhert, Christy, Lock box solutions reengineer payments; Aug. 1996; acs01039337.
Mead, Wendy S.; Two Banks' Imaging Deals Target Fee Revenue Increases; The American Banker; May 9, 1997; acs01039019.
Moyer, Liz; Bank of Montreal to Install Imaging System by Unisys for Retail Lockbox Services; The American Banker; Oct. 22, 1996; acs01039023.
Moyer, Liz; KeyCorp joins trend to check imaging for lockbox; The American Banker; Aug. 23, 1996; acs01039004.
Unknown, NCR introduces 7780 item processing system; image-based system scans and reads documents; Mar. 11, 1992; acs01039038.
Marjanovic, Steven, NationsBank offers lockbox imaging; Jul. 3, 1995; acs01039350.
Unknown, NationsBank rolls out first wholesale lockbox imaging; Aug. 3, 1995; acs01039351.
Shannon, John, New lockbox platform due out at NationsBank; Feb. 1998; acs01039384.
Armstrong, Douglas, Norwest eases difficulty of Interstate banking Bank's customers may use the same account number at any branch; Oct. 12, 1995.
Price, Joanne et al.; Request for Filing a U.S. Provisional Application entitled "Doculink Imaging System," May 11, 1999.
Maturi, Richard, Personal Finance; When you Need to Send Cash in a Flash; Sep. 25, 1988.
Buckley, JP et. al., Processing Noisy Structured Textual Data Using a Fuzzy Matching Approach Application to Postal Address Errors; XP-001132075; pp. 195-205 (11 pages); Dec. 2000.
Schutzer, Daniel; Get ready for electronic commerce; ABA Banking Journal; Jun. 1995; acs01038994.
Jensen, Cindy, U.S. Bank effectively manages complexity; May/Jun. 2006; acs01039402.
Jensen, Cindy, U.S. bank effectively manages complexity; acs01039398, May-Jun. 2006.
Jensen, Cindy, U.S. bank effectively manages complexity; acs01039400, May-Jun. 2006.
Unknown, Wholesale lockbox imaging; Feb. 1, 1993; acs01039331, May-Jun. 2006.
Khoury, S. J. "International Banking: A special Look at Foreign banks in the U.S."journal of International Business Studies, vol. 10, No. 3 (Winter, 1979), pp. 36-52.
Annual Report Pursuant to Section 13 or 15(d) of The Securities Exchange Act of 1934, Form 10-K, Intelidata Technologies Corporation, Fiscal Year Ended Dec. 31, 2001.
CESNaBANCO introduces stored value card technology blockbuster video is first merchant partner.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest document ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.

(56) References Cited

OTHER PUBLICATIONS

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Carreker, Electronic check presentment: Capturing new technology, http://proquest.umi.com, Banking Management, Rolling Meadows: vol. 71, Issue 2, Mar./Apr. 1995, p. 32, 5 pages.
First Data markets stored-value cards, Cards International, Jan. 30, 1996, p. 5.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Anonymous, Operating in a multi-currency environment, ProQuest document ID 9215937, ISSN/ISBN 09589309, Oct. 1995.
Payment data, www.paymentdata.com, Mar. 5, 2004.
Maher and Troutman, Payor's Prescription for Painless Migration to Electronic Healthcare Payments and Remittances Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from its Own Game, http://www.thestreet.com, Jun. 20, 2002.
Technology, In Brief Wachovia-InteliData Deal, May 7, 2002.
Zuckerman, The Hedge-Fund Craze; The Wall Street Journal, Jun. 12, 2002.
McDonald, The Stars in the Sky Flicker, and Fund Stars Do the Same, The Wall Street Journal, Jan. 15, 2003.
Cohen, International Banking and Financial Market Developments, BIS Quarterly Review, Feb. 2000.
Finance & Development, Management Risks to the International Banking System, Dec. 1996.
Norton, International Banking Law on the Threshold of the Twenty-First Century, Essays in International Financial & Economic Law, No. 1, Jul. 1996.
Blockbuster running test of a stored value card, The American Banker, Sep. 1, 1995.
Card Flash Daily Payment Card News, www.cardweb.com, printed Sep. 23, 2004.
Malhotra, Clearing House Enumerates e-Payments Ills, The American Banker, vol. 167, No. 154, Aug. 23, 2002.
Dialog file 20, #10279554; Offer: Book Yourself Free Cassettes; Mar. 25, 2000; Birmingham Post, p. 16.
Du Pont's Electronic Payments, Corporate EFT Report, v9, nl, Dialog file 636, Accession No. 01066902, Jan. 11, 1989.
Fidelity Helps Fund Sellers Trim the Taxes They'll Owe, The Wall Street Journal, Nov. 7, 2002.
Norris, First data unit develops blockbuster cash card, Omaha World Hearld Sunrise Edition, Business Section, Jan. 19, 1996, p. 16.
Harsh Truth: Your Investments Likely Won't Make Any Money.
Goode, On Profit, Loss and the Mysteries of the Mind, The New York Times, Nov. 5, 2002.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.
Michael Miller, The Complete Idiots Guide to Online Auctions, p. 271-272.
Anderson, John, Chase unveils next generation of all-in-one check disbursement system, PR Newswire, New York: May 9, 1994.

INTERNATIONAL BANKING SYSTEM AND METHOD

CROSS-REFERENCE TO RELATED APPLICATIONS

This application is a Divisional of U.S. patent application Ser. No. 12/883,324 filed Sep. 16, 2010, which is a Divisional of U.S. patent application Ser. No. 09/779,950, filed Feb. 9, 2001, now U.S. Pat. No. 7,822,656 which claims priority to U.S. provisional patent application Ser. No. 60/182,469, filed Feb. 15, 2000, entitled PRIVATE LABEL BANKING SYSTEM AND METHOD, their entirety of which are incorporated herein by reference.

FIELD OF THE INVENTION

The present invention generally relates to systems and methods for conducting international banking operations and more particularly to providing an international infrastructure to a strictly local bank.

BACKGROUND OF THE INVENTION

In order to conduct international banking operations, an extremely large, extensive, complicated and expensive infrastructure is absolutely required. Each country around the world has its own unique rules, regulations and requirements for who can provide banking services in that country.

Typically, only large multinational financial institutions such as Chase Manhattan Bank, the assignee of the present invention, has the resources to provide such international banking services. Furthermore, even among large financial institutions, not all of them are members of the various clearing systems (e.g., Trans-European Automated Real-Time Gross settlement Express Transfer system (Target), Real-Time Gross Settlement systems (RTGS) and the Multi-Lateral Net Settlement systems (MLNS) in Europe).

Because of the lack of an international presence, most banks accordingly had developed relationships with regional banks in different parts of the world. When a client of the bank (for example in the United States) desires to conduct a transaction in a different part of the world (Germany for example) the bank contacts its associate and coordinates the transaction with a correspondent bank. Accordingly, if a bank has clients which require international banking services, the bank must establish and maintain relationships with a multitude of correspondent banks throughout the world. The maintenance of these various relationships is both cumbersome, expensive, and time consuming both with respect to the bank and its clients.

International services typically required by customers include: direct payment initiation (high value (wire) and low value (Automated Clearing House (ACH) check disbursement)); receipt of credits of funds (both high value and low value including check deposits and collections as well as locks box processing); timely balance and transaction reporting; liquidity management (Automated Investment (Sweeps), netting and pooling of grouped accounts); timely and attentive customer service in the local time zone; and purchase of checks in foreign currencies at their local branch office.

SUMMARY OF THE INVENTION

The present invention solves the problems of the prior art as described above by providing banks with access to a previously inaccessible existing international infrastructure. Throughout this discussion, a bank without the international presence shall be denoted as a client bank whereas the bank implementing the system and method of the present invention is known as the provider bank.

In order to initiate an international transaction through the provider bank, the provider bank first establishes on its system, a set of accounts for each of the customers of the client bank. These accounts are totally separate from the accounts of the customers of the provider bank and are therefore legally considered "on the books" of the client bank and are therefore not legally customers of the provider bank.

In essence, this model provides a new branch of the client bank (the client bank environment) in the system of the provider bank. The client bank environment has its own Demand Deposit Account (DDA) module to process account entries and calculate interest and its own funds transfer module to initiate and to receive funds transfers.

The primary interface into the funds transfer section in the client bank environment is to the funds transfer section of the provider bank environment. The funds transfer section of the provider bank is coupled to the systems which constitute the international banking infrastructure that is able to process banking transactions on a global basis for the customers of the client bank.

As a customer requests a particular international transaction, it is made known to the client bank directly by the customer. The client bank then communicates the requested transaction to the funds transfer section in the client bank environment within the system of the provider bank. The communication between the systems of the client bank and the provider bank systems can be made through a variety of means such as a CPU to CPU connection, a Value Added Network (VAN), a secure Electronic Data Interchange (EDI) transmission or even through the Internet. Once the client bank funds transfer section has received the requested transaction, it references the customer's accounts in the client bank environment (e.g., to debit the customer's account) and then transmit a transaction message (e.g., a payment message) to the funds transfer section of the provider bank environment. The funds transfer section of the provider bank can then process the transaction as if it was being made for one of the provider banks own customers (e.g., a high value wire transfer) through one of the clearing systems.

The system as described above is further able to provide liquidity management services to the customers of the client bank, check printing capabilities and check clearing functionality as well as lockbox processing services. In a further embodiment of the present invention, the system can be used for settlement services between members of a Business to Business (B2B) exchange service (e.g., Chemconnect).

BRIEF DESCRIPTION OF THE DRAWING(S)

For the purposes of illustrating the invention, there is shown in the drawings a form which is presently preferred, it being understood however, that the invention is not limited to the precise form shown by the drawing in which.

DETAILED DESCRIPTION OF EMBODIMENTS OF THE INVENTION

Figure 1:
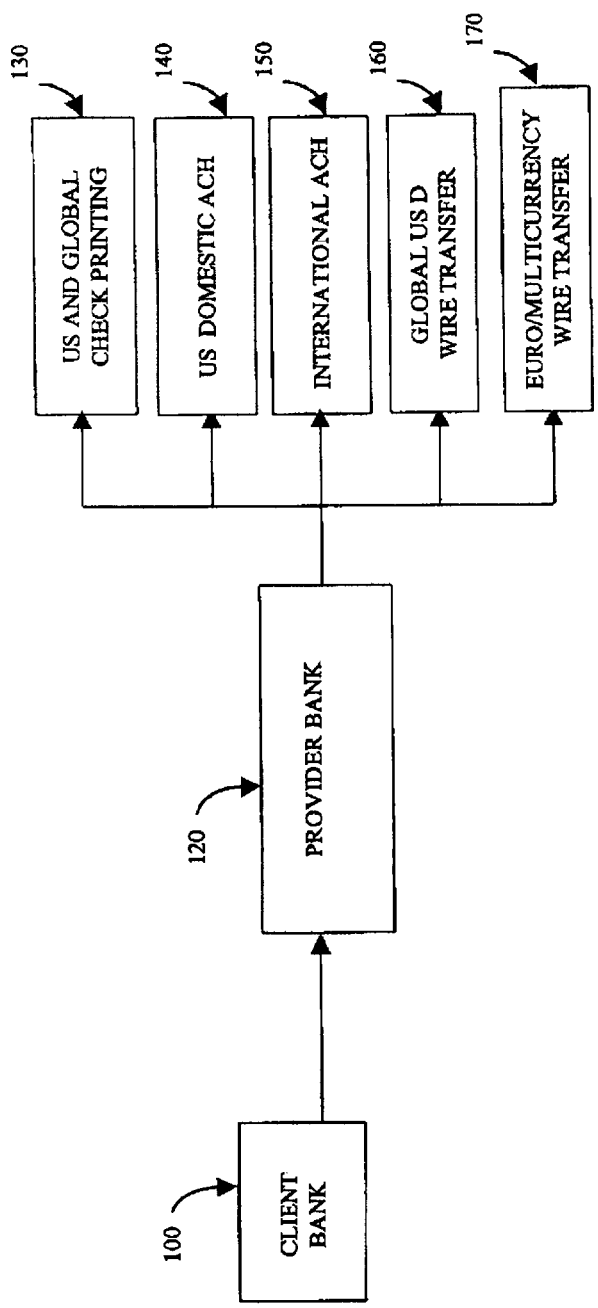
FIG. 1 illustrates an overview of the system and capabilities of the present invention.

FIG. 1 illustrates a summary of the system of the present invention and some of the functionality provided thereby. The client bank 100 is typically a smaller local bank without any infrastructure for providing its customers with international banking services. The client bank 100 can either be based in the U.S., or based anywhere throughout the world. In the ever increasing globalization of the economy in both the U.S. and throughout the world, the customers of client bank 100 are increasingly finding it necessary to conduct banking transactions in foreign countries. For example, a United States manufacturing corporation based in Cleveland Ohio is now finding itself purchasing parts in Taiwan for assembly in Mexico for shipment to a customer in South Africa. This customer therefore has a need to both pay the supplier in Taiwan, issue checks to its employees in Mexico and to obtain payments form its customers in South Africa. The client bank 100 of the customer in Cleveland Ohio is incapable by itself, of conducting each of these transaction for its customer. Accordingly, customer 100 develops a relationship with provider bank 120 that has the international infrastructure for providing all of these international banking services to the customer in Cleveland. In a preferred embodiment of the present invention, the services provided by provider bank 120 to client bank 100 are private labeled such that the customer of client bank 100 is unaware that provider bank 120 is even involved.

As client bank 100 receives a request for an international banking transaction from one of its customers, client bank 100 appropriately formats the transaction as a message for transmission to provider bank 120 on link 110. As will be further described below, link 110 between the two banks can be either a direct dial up connection from CPU to CPU, a Value Added Network (VAN), a leased line, or the Internet. The format of the message between client bank 100 and provider 120 can be one of several including Accredited Standards Committee (ASC) standard ASC X12 820, EDI Administration, Commerce and Transport standard (UN/EDIFACT or EDIFACT), a secure EDI format or a proprietary format as described below.

The systems in provider bank 120 are capable of receiving the transaction message from client bank 100 and capable of performing the requested banking transaction. As illustrated in FIG. 1, these transactions include the printing of checks both within the U.S. and around the world 130, initiating a U.S. domestic ACH transaction 140, initiating an international ACH transaction 150, a wire transfer throughout the world of U.S. dollars 160 and a wire transfer of currency in any denomination including Euros and mixed denominations 170. As will be further described below with respect to the remainder of the Figures, provider bank 120 is capable of performing a wide variety of banking services such as the reception of credits and payments and lock box processing for example.

Figure 2:
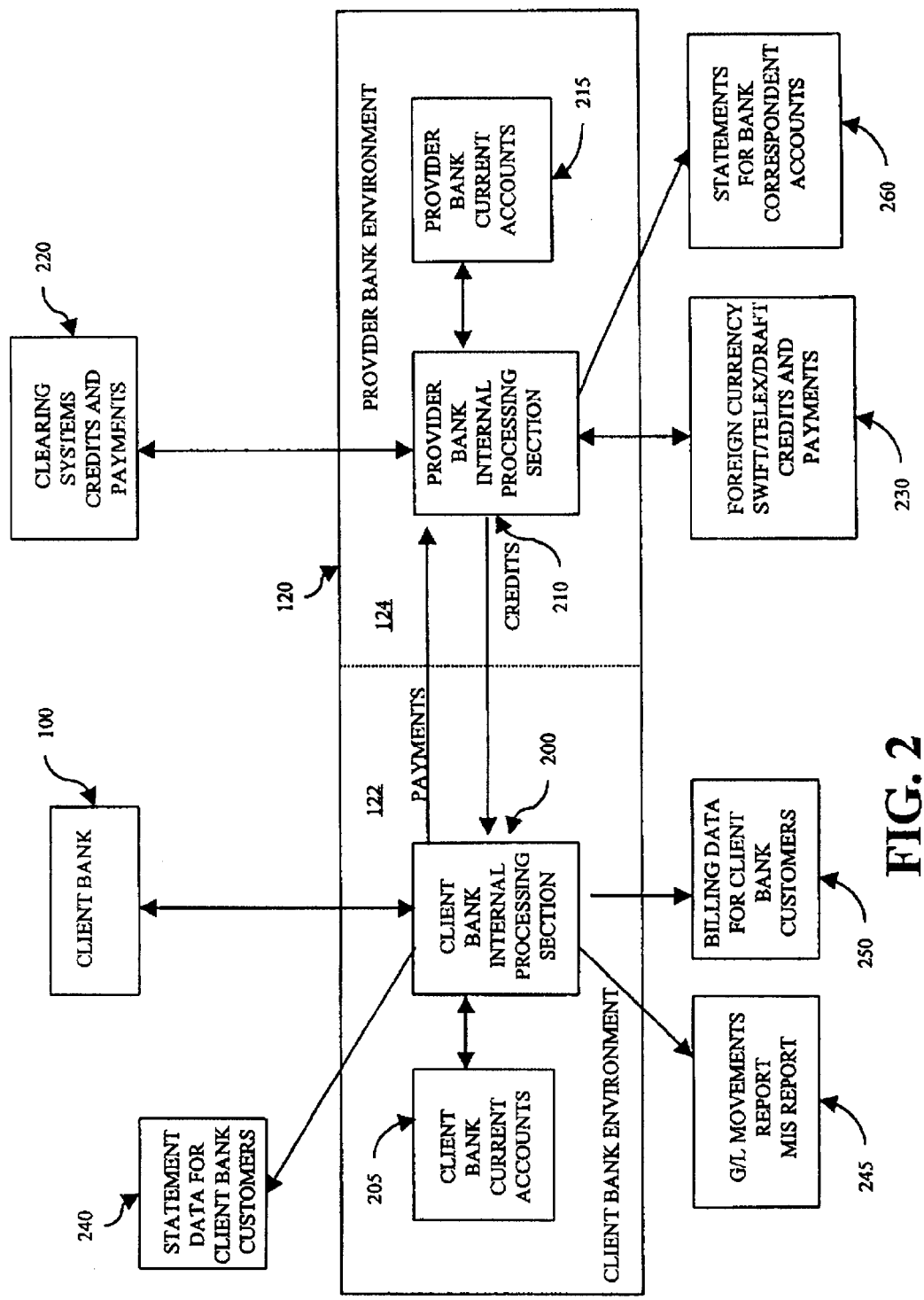
FIG. 2 depicts the client bank and provider bank environments within the system of the provider bank.

FIG. 2 illustrates in more detail the system of the present invention. As illustrated in FIG. 2, the funds processing systems of the provider bank 120 are logically divided into 2 environments, a client bank environment 122 and a provider bank environment 124. As previously described, the client bank environment 122 which holds the accounts 205 of the client banks 100 customers, is an entirely logically separate environment which allows the customer's accounts 205 to be considered to be held on the books of the client bank 100. Each of the environments 122 and 124 have been illustrated as containing two main components. The provider bank embodiment contains an internal processing section 210 which is coupled to the accounts 215 of the provider bank. Similarly, the client bank environment 122 is illustrated as having a complimentary client bank internal processing section 200 coupled to the accounts 205 of the customers of the client bank 100. Although simplified in the present Figure in a single section 210 or 200, the internal processing sections are appreciated as containing all of the processors, software and interfaces for maintaining the accounts 205, 215 interfacing with external sources (e.g., client bank 100 and clearing and exchange systems 220, 230) and generating reports and statements (240, 245, 250 and 260).

As previously described, the client bank 100 communicates with provider bank 120 using link 110. As further described below, there are a variety of structures and data formats which can be used to provide this communication link 110. The link 110 is illustrated as being bi-directional as the client bank 100 communicates payment messages as well as Advice To Receive (ATRs) to the internal processing section 200 while the internal processing section 200 communicates back to the client bank 100 various statuses and reports, as well as funds transfers to and from the client bank 100 and the customers account 205.

The internal processing section 200 for the client bank is shown as generating various statements and reports. Specifically, the processing section 200 generates statement data 240 for the customers of the client bank. This statement data can be formatted and sent directly by the internal processing section 200 to the customers of the client bank 100. Alternatively, the statement data can be transmitted back to the client bank 100 for its own generation of the statements for its clients or alternatively sent to a third party for generation of the statements on behalf of the client bank 100.

The internal processing section 200 also generates financial reports 245 such as a General Ledger (GL) movement report as well as a Management Information System (MIS) report. The financial reports 245 are generally accounting reports that are transmitted to the client bank 100 in order that the client bank 100 may update their systems and books. The financial reports 245 can be sent either electronically, by hardcopy or by both methods.

One additional report illustrated in FIG. 2 as being generated by the internal processing section 200 is a billing data report 250. The billing data report 250 informs the client bank 100 of the banking actions undertaken by the provider bank 120 on behalf of the customers of the client bank 100 and the corresponding charges for the banking actions. Presumably, these charges from the provider bank 120 to the client bank 100 are passed onto the customers of the client bank 100 that caused the charges to be incurred.

Although only a single client bank environment 122 is illustrated in FIG. 2, it is readily appreciated that a similar bank environment is established for each client bank 100 making use of the present invention. In a preferred embodiment of the present invention, each of these client bank environments 122 would interface with the single provider bank environment 124 illustrated in FIG. 2. As further described below, each client bank 100 additionally has its own account 215 in the provider bank environment 124.

As briefly described previously, the provider bank environment 124 includes an internal processing section 210 that is coupled to the accounts 215 of the provider bank. Each of the client banks 100 using the service of the present invention has at least one account 215 with the provider bank. In a preferred embodiment, the client bank 100 has several accounts 215, each in a different currency for conducting transactions in the different currencies. In further preferred embodiment, each customer of the client bank actually has two accounts 205 in the client bank environment 122 in order to provide for double entry accounting practices.

As illustrated in FIG. 2, the two processing sections 200 and 210 communicate both payments and credits. This communication is accomplished via internal messaging systems within provider bank 120. Payments typically originate from the customer accounts 205 and credits typically are received by processing section 210 from external sources such as clearing systems 220 and 230 for the crediting of customer accounts 205.

The following is an example of the operation of the system in executing a foreign payment. The customer of the client bank 100 (not shown) contacts client bank 100 and instructs them to make a payment. For example, the customer might instruct client bank 100 to perform a wire transfer to the German bank of one of its suppliers. Client bank 100 formats the transaction message and communicates it to the provider bank 120 over link 110. As further described below, there is typically a front end processing section (not shown in FIG. 2) within provider bank 120 which receives the transaction from client bank 100 and forwards the transaction message to processing section 200. Upon its receipt, processing section 200 debits the account 205 corresponding to the customer and transmits the funds along with a payment message to processing section 210 within the provider bank environment 124. In a preferred embodiment, the transfer of funds from a customer account 205 to the processing section 210 is immediate via a memo post transaction.

Upon receipt of the funds and the transaction message from processing section 200, the processing section 210 formats the payment instruction in accordance with the particular clearing system 220 that is going to be used to transfer the payment to the German bank. For example, the German bank might only be a member of the German RTGS system and the processing section 210 would format the payment for transmission to this clearing system. Alternatively, the German bank of the supplier might be a member of the German MLNS clearing system which requires a different formatting of the payment message. Once the payment message has been formatted for the appropriate clearing channel, it is transmitted to this clearing channel for ultimate receipt by the German bank. If the payment is going through a correspondent bank in a foreign country rather than directly through a clearing system 220, the payment instruction is forwarded to the correspondent bank through the Swift or Telex system 230.

Figure 3:
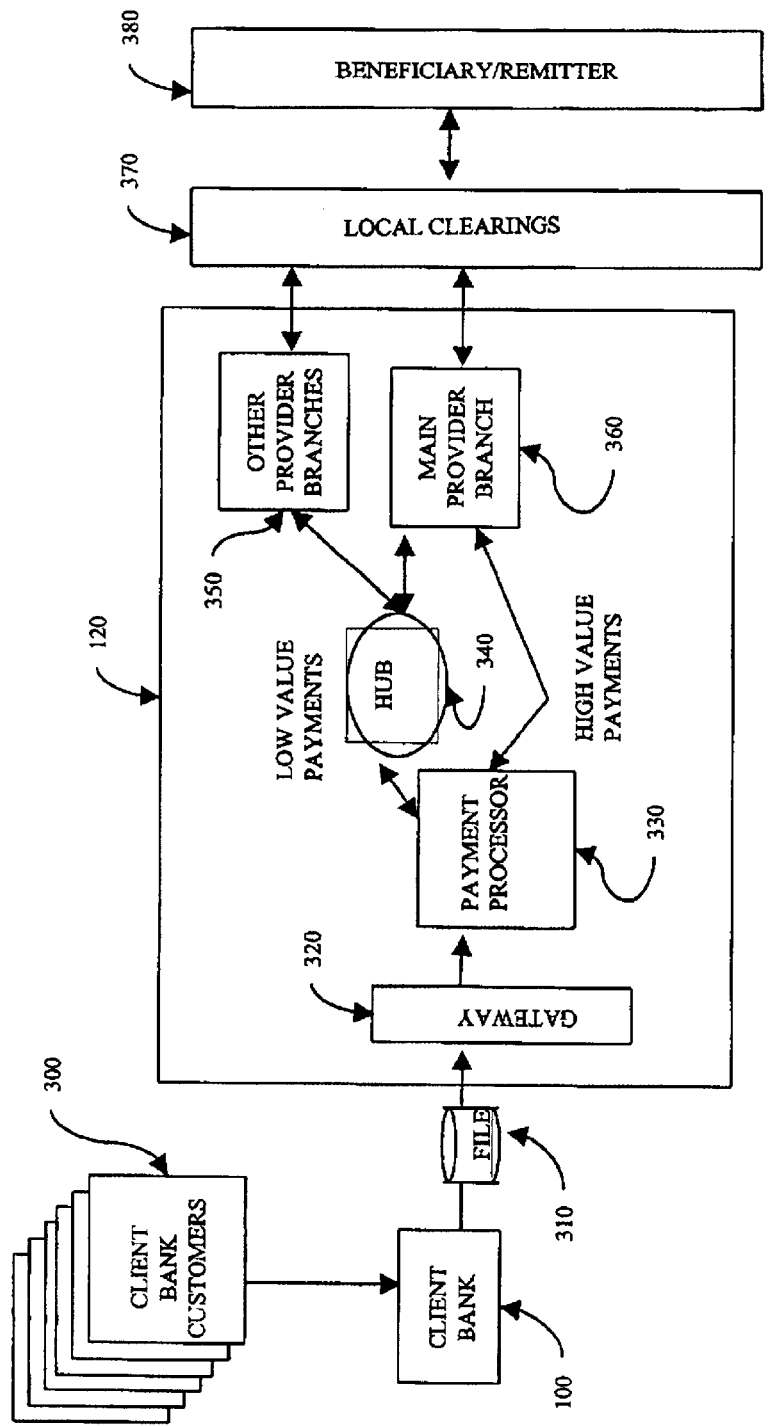
FIG. 3 illustrates a first manner in which transaction information is communicated from the client bank to the provider bank.

FIG. 3 illustrates an embodiment of the present invention in which instructions for financial transactions are communicated from client bank 100 to provider bank 120 through a proprietary file structure. FIG. 3 further illustrates the processing of payments and credits to and from provider bank 120 through local clearing systems 370 to and from beneficiaries/remitters 380. In the example illustrated in FIG. 3, one or more of the customers 300 of client bank 100 wishes to execute an international transaction. Again, the customers can be located in a foreign country and desiring a payment into the U.S. or in the U.S. and desiring a payment into a foreign country. Alternatively, the system depicted in FIG. 3 can be used for a foreign country to a foreign country payment. Once one or more payment transactions have been received by client bank 100, they are formatted into a multiple transaction format and transmitted to provider bank 120 in file 310. The format of the payments in file 310 are such that multiple payment types and currencies are capable of being included in a single file 310. This includes Clearing House Interbank Payment System (CHIPS) format, FedWire, book, U.S. domestic ACH payments, and Euro or other foreign currency payments. Wire, international ACH payments, checks and drafts are also capable of being included in the single mixed file 310. As previously described, the formats for the individual payments can be in UN/EDIFACT, ANSI X12 as well as other formats.

In a preferred embodiment of the present invention, file 310 is communicated from client bank 100 to provider bank 120 over the public Internet. The public Internet provides a very cost effective means of communicating between client bank 100 and provider bank 120. This communication over the public Internet is capable only due to extensive security means. In the preferred embodiment, three different types of public/private key infrastructure (PKI) security models are supported. These security models include Trusted Link Templar™, RSA and Entrust™. All three of these security models incorporate full strength encryption, digital signature authentication, digital certificates, and non-repudiation. In this manner, client bank 100 and provider bank 120 can safely securely and confidently transmit financial transactions over the public Internet. In an alternative embodiment, a Value Added Network (VAN), leased line or direct CPU to CPU communication links are options.

In the preferred embodiment using the Internet, the file 310 is generated by the operating system within the client bank 100. The file 310 is then forwarded to the agreed upon security module such as Trusted Link Templar®. The security module encrypts the file 310 and digitally signs the message. The encrypted signed file 310 is then formatted for particular agreed upon format. For example, the file 310 can be forwarded to an EDI translator where it is translated into a ANSI X12 or EDIFACT message format.

The file 310, encrypted, digitally signed and formatted is enclosed in a secured e-mail Simple Mail Transfer Protocol (SMTP) format and sent through the client bank 100 firewalls to the Internet. The gateway 320 within provider bank 120 receives this secured e-mail message 310 and routes it to the server where Templar™ resides. In the embodiment depicted in FIG. 3, it is assumed that the Templar™ server resides within the gateway 320 itself, but as appreciated by those skilled in the art, the Templar™ server can be separate from the gateway 320. Templar decrypts the file 310 and verify the digital signature for authentication. Once the gateway 320 has authenticated the digital signature, a non-repudiation message is sent back to client bank 100 indicating that the provider bank 120 has validated the sender's identity and confirmed that the file was received unchanged. The financial transaction(s) contained in file 310 are then forwarded to the payment processor 330 for processing. EDI translation as well as the application of a second level of authentication against an EDI message would take place at this point as well. The payment processor 330 separates out each of the transactions for routing the payment. The routing decision primarily depends on the destination of the payment as well as its value.

As illustrated in FIG. 3, low value payments, typically below fifty thousand United States dollars (USD) are transmitted by one method whereas high value payments are transmitted via wire. Low value payments passed through a hub 340 within provider bank and are forwarded to either the main provider branch 360 or a local provider branch 350 that is more convenient with respect to the ultimate destination of the payment. For example, if the beneficiary 380 is in France, the low value payment will be forwarded to a local provider branch 350 located in France. If there is no local branch 350 of the provider bank 120, the low value payment is transmitted by the hub 340 to the main provider branch 360. Branch 360 is then able to transmit the low power payment value through a local clearing system 370, perhaps through a correspondent bank with which the provider branch 360 has a previous relationship.

The local clearing system 374 low value payments can be the international ACH system, local GIRO systems or other local banking mechanisms with which the provider bank 120 has previously established relationships. The local clearing system 370 is then able to provide the beneficiary with the funds.

If a foreign currency exchange (FX) is required with respect to the payment, such FX preferably occurs in the main provider branch 360. The client bank environments 122 and the provider bank environment 124 previously described with respect to FIG. 2 are preferably embodied in the payment processor 330. In a preferred embodiment, the payment processor 330 is located at the main provider branch 360, but its functions can be embodied at local provider branches that maintain the relationships with the client bank 100.

High value payments, greater than fifty thousand USD, are transmitted by the payment processor 330 to the main provider branch 360. As previously described, the main provider branch 360 uses local clearing systems 370 such as RGTS, MLNS, European Banking Association (EBA) Euro clearing, correspondent banks, and the Trans-European Automated Real-time Gross settlement Express Transfer (TARGET) system.

Although the above has described the process followed for payments from client bank customers 300 to beneficiaries 380, a reverse of the process is used for credits to the customers 300 (i.e., payments from remitters 380). How credits are specifically handled are subject to predetermined contractual arrangements with the particular client bank 100. For example, a credit might be deposited in the customer's account 205 (see FIG. 2) or might be forwarded directly to the client bank 100 for deposit in the customer's account (not shown) at the client bank 100.

Figure 4:
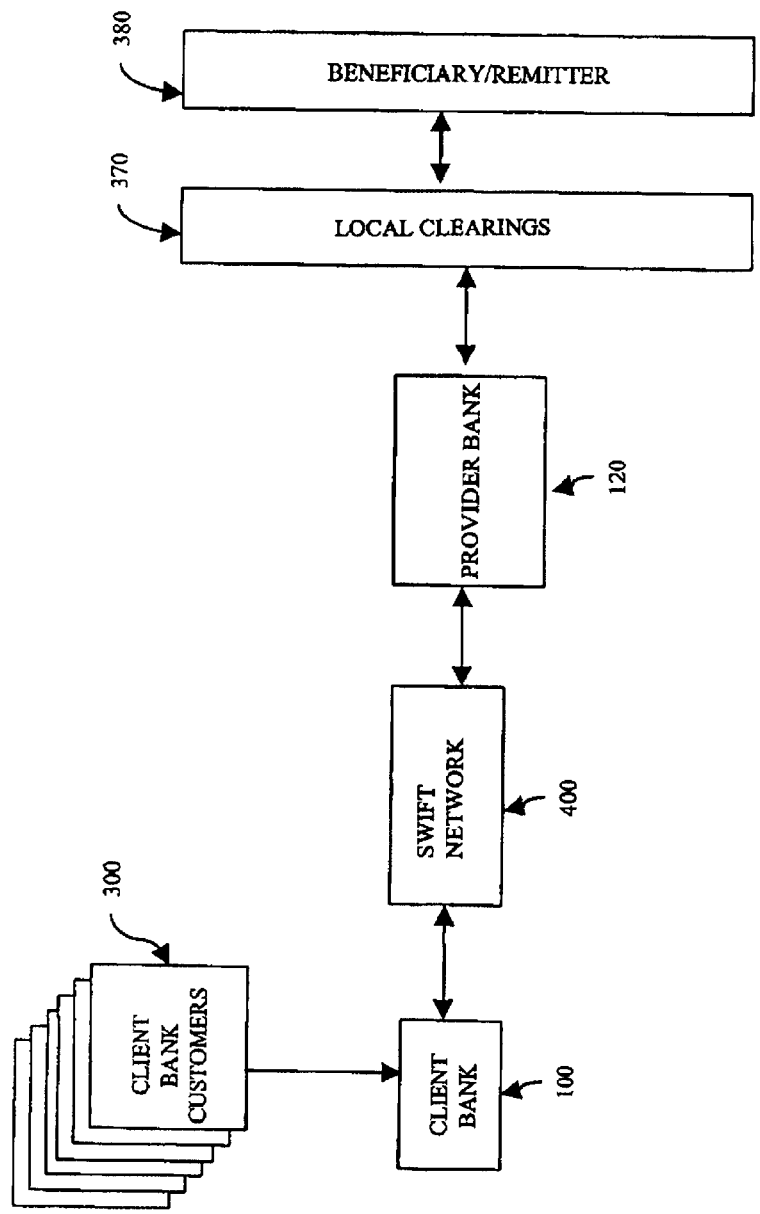
FIG. 4 illustrates a second embodiment for transmission of transactions between the client bank and the provider bank.

FIG. 4 illustrated an alternative embodiment in which payments and credits are transmitted. In the embodiment illustrated in this figure, financial messages are communicated between client bank 100 and provider bank 120 using the SWIFT network. SWIFT is a bank owned cooperative supplying secure messaging services and interface software employed by over six thousand seven hundred financial institutions in close to two hundred countries. As most significant client banks 100 subscribe to the SWIFT network, this interface for communicating financial messages significantly expands the service of the present invention.

Figure 5:
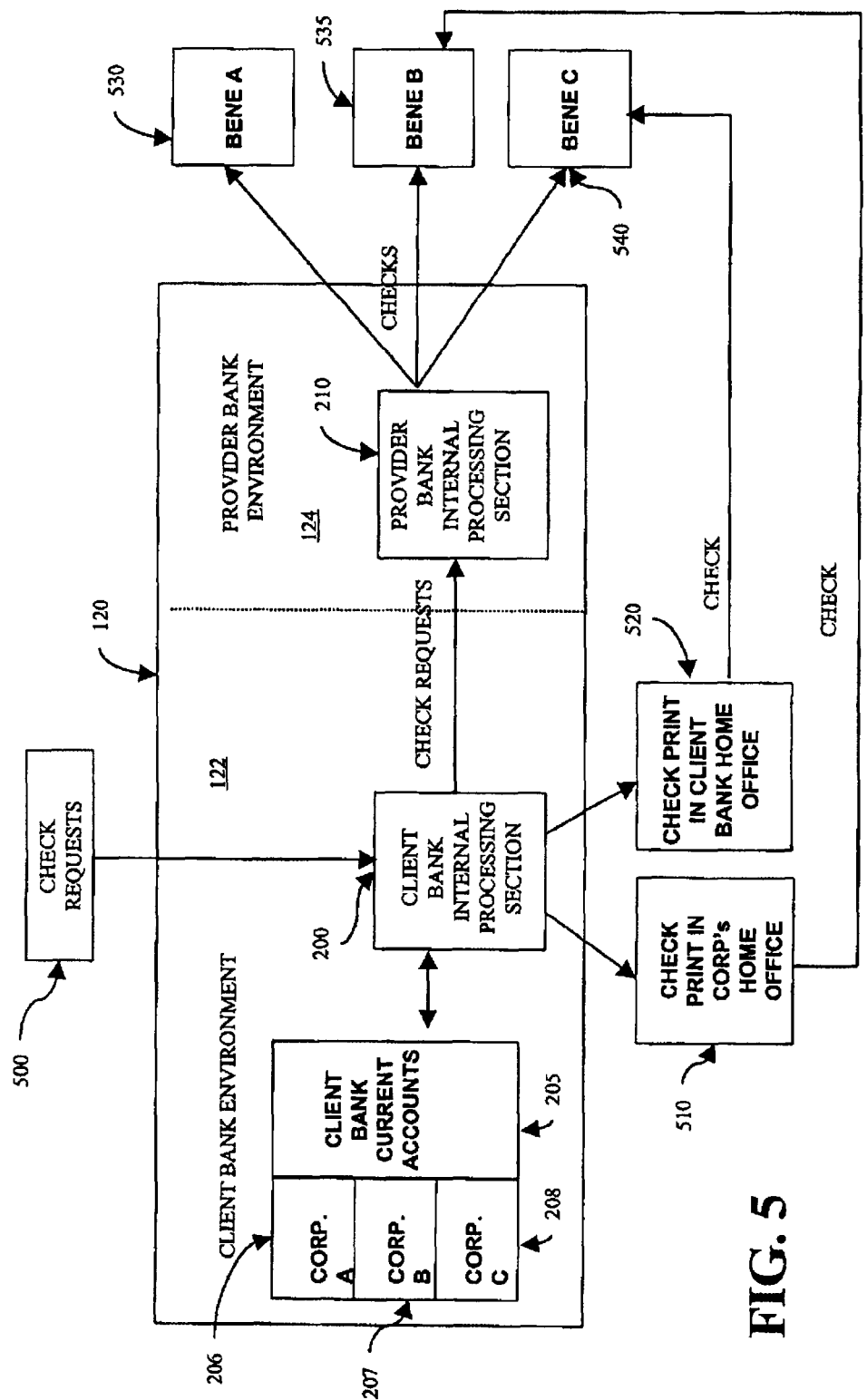
FIG. 5 illustrates an example of a check transaction.

FIG. 5 illustrates an embodiment of the present invention for the issuance of checks. The check request 500 are transmitted by the client bank (not shown) to the client bank internal processing section 200 within the provider bank 120. The structure of the provider bank 120 is the same as previously illustrated. The client bank current accounts 205 has been further illustrated as including the accounts for its customer's Corporation A 206, Corporation B 207 and Corporation C 208. A client bank 100 typically has three to four thousand different accounts (e.g., 206-208) contained in the client bank accounts 205.

As the internal processing section 200 receives the check request, the requested amount is debited from the customer's account 206-208, in order to effectuate the issuance of the check. At this point, as shown in FIG. 5, there are three different ways in which the actual physical check may be issued. In the first embodiment, the check request is transmitted to the provider bank internal processing section 210 in the provider bank environment 124. The physical check can then be printed and issued from the processing section 210 and directly forwarded to the beneficiary, e.g., beneficiary A 530, beneficiary B 535 or beneficiary C 540. Alternatively, the internal processing section 210 may use one of the other payment mechanism such as shown in FIG. 3 to have the check physically printed and forwarded to the beneficiary, 530-540, by a local correspondent bank.

In the second and third embodiment, the client bank internal processing section 200 issues instructions to either the home office of the corporation 510 or the home office of the client bank 520 in order to have the check printed at either of these locations. In these embodiments, a check design and print module (included in 510 and 520) is provided to the corporation or the client banks' home office that allows the users to create and customize check layouts to suit their particular requirements, for example requirements such as the local currency and country standards. This capability of the present invention eliminates the need for either the corporation or the client bank to inventory check stock. This feature, also known as multi-bank/multi-currency capability, enables check printing to be drawn on any bank anywhere in the world in which an account is maintained and which the currency format is available. If the client bank has several branches, each of the branches can make use of the check printing capabilities of the present invention by accessing the server 520 in the client bank home office. Similarly if a corporation has many divisions, each of the divisions can make use of this capability by accessing the multi-bank/multi-currency capability in the corporations home office 510. In either case, the home office of the client bank or the treasurer of the corporation is able to monitor activity from all locations on line at the home office.

One further feature of the present invention with respect to checks is its clearing capabilities. The present invention provides a reliable, straight forward procedure for clearing multi-currency checks denominated either in National Currency Units (NCU) (e.g., USD) or Euros. The proceeds of a check so cleared can be credited into an account in the currency in which the check was drawn or can be converted by provider bank 120 and credited to any account held with provider bank 120 throughout the world. Items in all currencies (including Euros) receive credit according to a negotiated availability schedule (under usual reserve). In a preferred embodiment "third country" checks, i.e., checks denominated in a currency other than the currency of the country where the drawee bank is resident (e.g., a USD check drawn on a French bank in France), and checks with a face value exceeding $50,000 equivalent are handled on a collection basis.

A further advantage of the present invention can also be explained with respect to FIG. 5. This advantage is liquidity management. In a preferred embodiment of the present invention, the provider bank 120 pays interest on individual DDA balances maintained in the client bank current accounts 205 (e.g. accounts 206-208). The sweeping of funds for investment purposes is not required, which simplifies reconciliation of the accounts. In a preferred embodiment, interest is accrued daily and credited monthly on the first day of the succeeding months. Interest rates can be set according to balance tiers (e.g. higher balance equals higher rate). In a further embodiment, interest is automatically adjusted for back values up to six months.

A further feature of liquidity management is zero balance and target balance sweeps. In a preferred embodiment, these sweeps are automatic and are used for concentration of funds of related accounts. For example, a sweep can be made from the accounts of various divisions of a corporation into a single corporate account. Furthermore, such sweeps can be performed to transfer funds from a collection account into a disbursement account. Both types of sweeps can be used to concentrate funds in the same currency or between an NCU and Euro. In a preferred embodiment, provider bank 120 automatically adjusts investments and interest for bank valuations. One of the main purposes of such sweeps is that the provider bank, in a preferred embodiment, pays a preferable interest rate if the balance of the account is above a minimum threshold. Sweeping funds from various accounts into a single account enables the customers to more easily achieve this minimum balance requirement.

Liquidity management according to the present invention also involves multiple account pooling. Credit and debit balances in the same currencies are notationally offset to reduce overdraft interest. There is no actual movement or commingling of funds employing this offset. Euro and NCU accounts held in the name of one customer can be part of the same pool. All accounts in the pool operate autonomously, earning and paying credit and debit interest on the basis of the individual daily balances and assigned rates. A separate "pooled interest" calculation is made on the aggregate net balance of the pool. The pooling effect (the pooled interest net of the interest paid to the individual accounts) is normally credited to a "pool leader" account. In this manner, the customer is provided with an incentive to have all of his accounts with provider bank 120 without being penalized for having a substantial sum of money spread across several accounts in several different currencies. The pooling benefit is calculated monthly and reports are generated that detail interest benefit allocation both at the pool leader and individual account levels.

Figure 6:
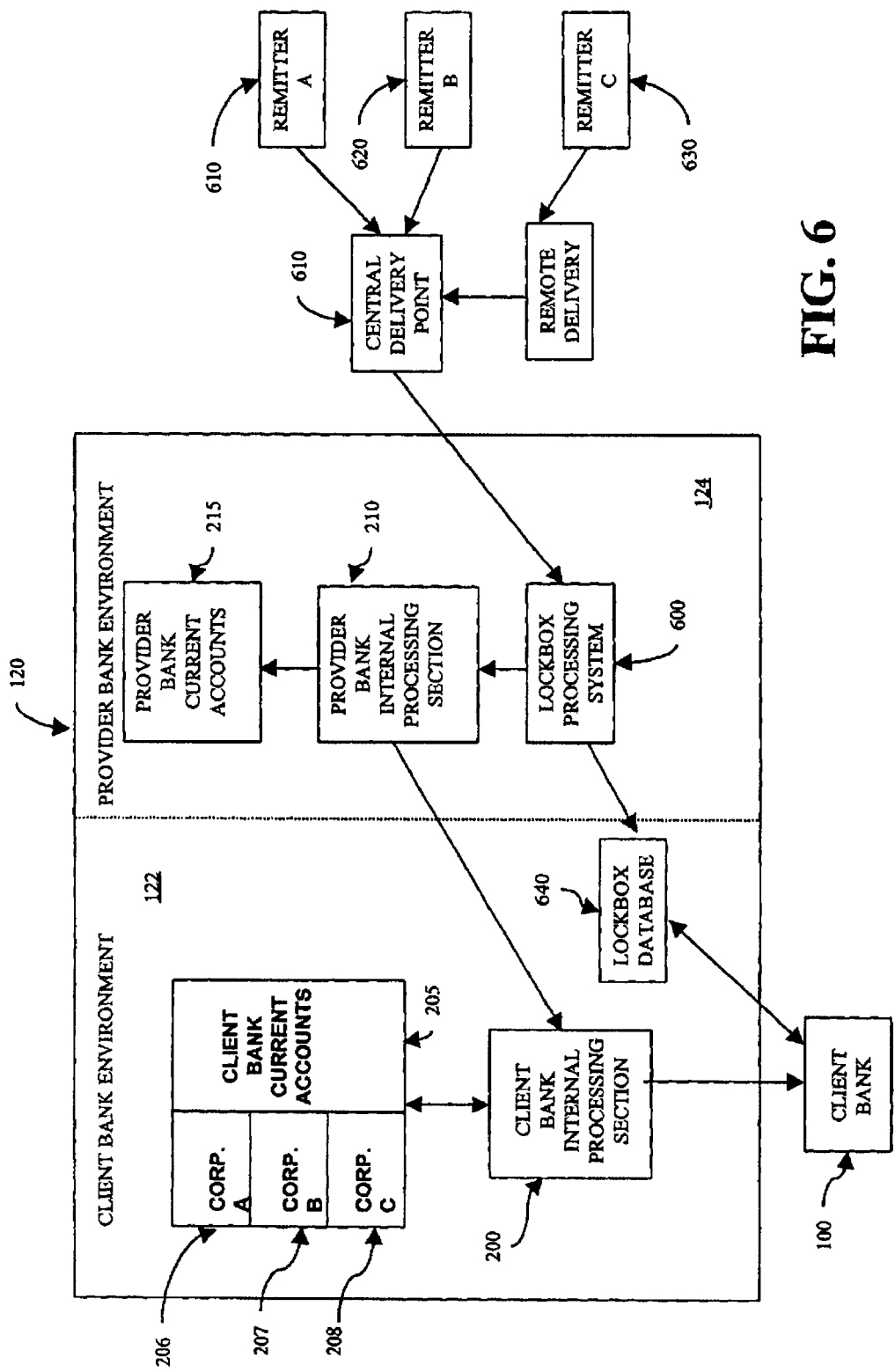
FIG. 6 depicts a lockbox processing embodiment of the present invention.

FIG. 6 illustrates a lock box processing embodiment of the present invention. As known to those skilled in the art, lockbox processing is a service in which the bank receives payments on behalf of a customer subscribing to the lockbox service. For example, the bank may process all of the incoming payments for a telephone company when its customers pay their telephone bills. As illustrated in FIG. 6, each of the remitters 615-625 forward their payments, ultimately, to a central delivery point 610. Remitter C 625 is illustrated as delivering its payment to a remote delivery point 630. The remote delivery point in turn forwards all of the payments it receives to the central delivery point 610.

On a periodic basis, e.g., daily, the central delivery point 610 transmits all of the receipt payments to the lockbox processing system 600 within the provider bank 120. The provider bank 120 opens the mail and sorts it by account and currency. Within lockbox processing system 600 there exists the hardware (not shown) to perform the following traditional lockbox operations. The checks included with the payments are processed using normal financial processing for incoming checks. This processing includes capturing the MICR data and creating a database of the information related to each check as well as an image of the check itself. Images are separately created for each of the invoices and other remittances contained in the envelopes from the central delivery point 610. Data is manually entered from the invoices and is associated with the images of the invoices as well as the images and data for the checks. All of the data for a particular remittance is cross referenced such that a user may look at the data and images for the check as well as the data and images for the invoices.

In the financial processing of the checks, the credits are passed to the internal processing section 210 for the crediting of the account for the client bank in account section 215. The internal processing section 210 furthermore advises the client bank internal processing section of the credits which then accordingly updates the specific account of the lockbox owner (206-208) in the client bank current accounts section 205.

Once the processing of all of the incoming mail by the lockbox processing system 600 is completed, the lockbox processing system 600 creates the lockbox database 640 which contains the images and data associated with both the checks and the invoices contained within each payment. As illustrated in FIG. 6, the client bank 100 has access to this lockbox database 640 for the purposes of generating statements for its customers and/or for exception, query and reconciliation purposes. In a further embodiment, the customers of the client bank 100 have access to the lockbox database 640, either directly, or through the client bank 100.

Figure 7:
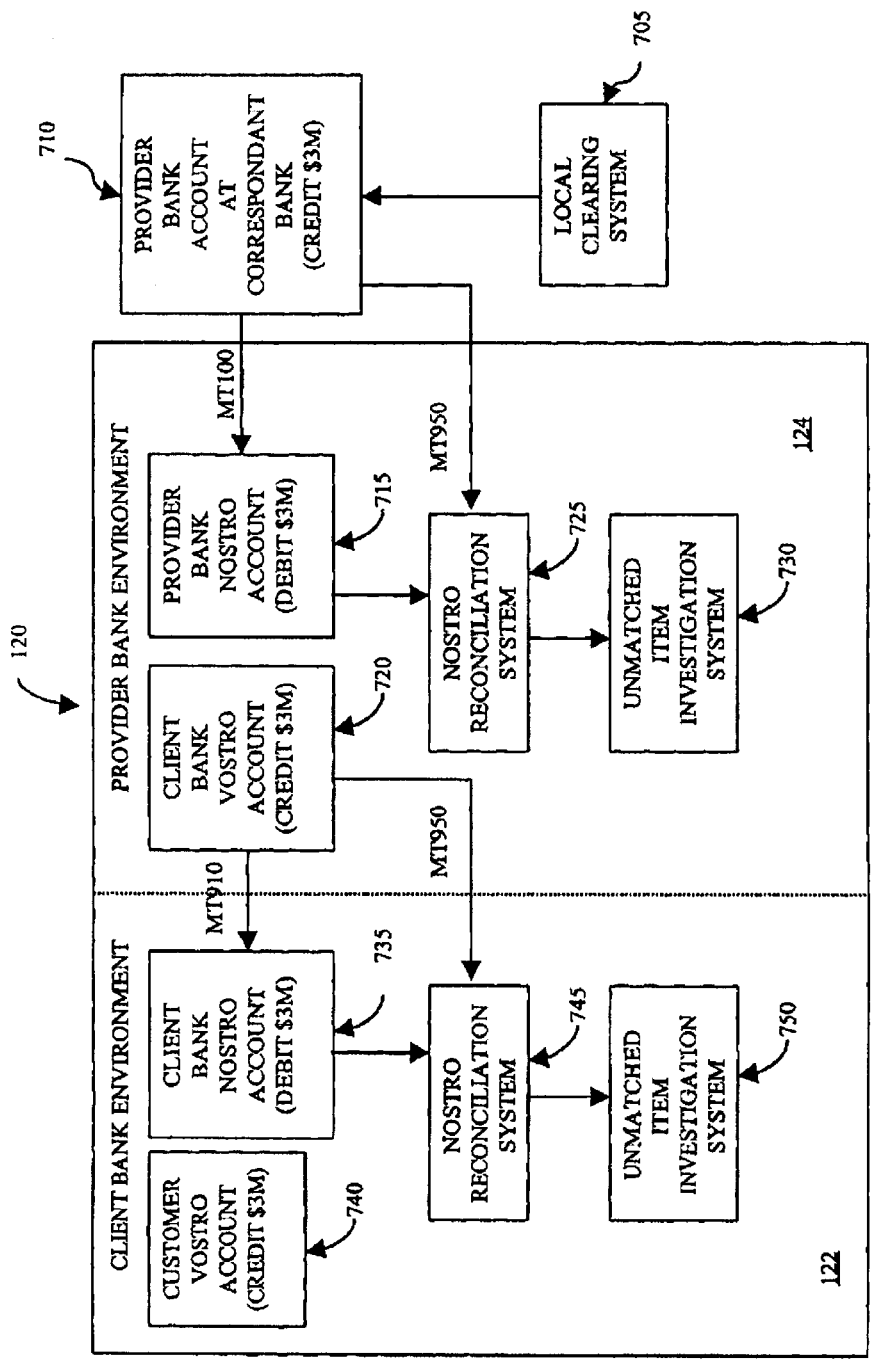
FIG. 7 illustrates NOSTRO account reconciliation.

FIG. 7 illustrates the system method of the present invention for reconciling payments and credits. In banking terms this is known as Nostro reconciliation. Accounts which one bank maintains on behalf of another bank are know as Nostro and Vostro accounts. From the viewpoint of a first bank, a Nostro account is an account that the first bank maintains on behalf of a second bank and a Vostro account is the account which the second bank maintains for the first bank. Reconciliation according to the present invention is a two stage process. The example illustrated in FIG. 7 is a reconciliation of a payment through a local clearing system 705 destines for the account 740 of a customer of the client bank. Firstly, there is a reconciliation in the books of the provider bank 124 and secondly in the books of the client bank 122.

In the example of FIG. 7, a $3 million dollar payment in favor of a customer of the client bank is cleared through a local clearing system 705. The funds are received by a correspondent of the provider bank and credited to the Vostro account 710 of the provider bank maintained at the correspondent bank. The funds are then transferred from the Vostro account 710 at the correspondent bank to the provider bank 120. Specifically, the correspondent bank in one embodiment of the present invention generates a SWIFT MT100 or MT202 payment instruction to the provider bank. This payment instruction results in a series of credits and debits in the accounts within the provider bank environment 124 and the client bank environment 122. The first is a debit against the provider bank Nostro account 715.

A first reconciliation is required to match the entries in the general ledger of the provider bank environment 124 and the entries relating to the same transaction processed by the correspondent bank. A general ledger entry for the $3 million is fed from the provider bank Nostro account 715 to the Nostro reconciliation system 725 in the provider bank environment 124. This entry is then reconciled with a corresponding entry from the correspondent bank. In addition to the MT100 payment instruction with respect to the $3 million credit described above, the correspondent bank transmits an MT950 statement of account to the Nostro reconciliation system 725 in the provider bank environment 124. The first reconciliation process requires the matching of an entry on the MT950 statement with respect to the $3 million transaction to the related entry on the provider bank ledger. The process is carried out in the Nostro reconciliation system 725 in the provider bank environment 124. Any unmatched item is referred to an investigation system 730.

The second financial transaction to occur is the crediting of the $3 million from the provider bank environment 124 to the customer account 740 in the client bank environment 122. In this transaction, the provider bank environment 124 is essentially acting as a correspondent for the client bank environment 122. As shown in FIG. 7, the client bank Vostro account 720 issues a SWIFT MT910 payment instruction that is transferred by the internal messaging system described above to the client bank Nostro account 735. This results in the crediting of the $3 million to the customer's account 740. A separate reconciliation is required to match entries in the client bank Nostro account 735 relating to the same transaction to the entries processed by provider bank environment 124 as correspondent for the client bank environment 122.

The client bank environment 122 matches transactions in the same way as described above with respect to transfers to the provider bank environment 124 from the correspondent bank. Specifically, the ledger entries are fed from the client bank Nostro account 735 to the Nostro reconciliation system 745. Similar to the statement described above, provider bank environment 124, acting as a correspondent bank, transmits an MT950 statement of account to the Nostro reconciliation system 745 in the client bank environment 124. This MT950 statement reflects the $3 million transaction between the provider bank environment 124 and the client bank environment 122. The Nostro reconciliation system 745 then attempts to matches the MT950 statement entries to the ledger entries. As with the first reconciliation, any unmatched items are referred to the investigation system 750.

Although the above description has been with respect to a incoming credit from a local clearing system, it is clear that the same reconciliation process is performed for outgoing payments from a customer account (e.g., account 740). Any transaction carried out by the provider bank environment 124 as correspondent for the client bank environment 122 results in a debit or credit to the relevant client bank Vostro currency account (e.g., account 720) in the provider bank environment 124. The provider bank environment 124 generates debit entries when they receive an MT100 from the client bank environment 122. For incoming receipts the credit entry will be generated by an MT100 or MT202 received from the external correspondent bank. As described above, when the provider bank environment 124 processes an incoming receipt it will also generate an MT910 and send this via the internal messaging system to the client bank environment 122. This standard process for all currencies leads to a very high automatic match rate in the Nostro reconciliation systems 725, 745. In a preferred embodiment, the Nostro reconciliation systems 725, 745 operate on a reconciliation processor.

Figure 8:
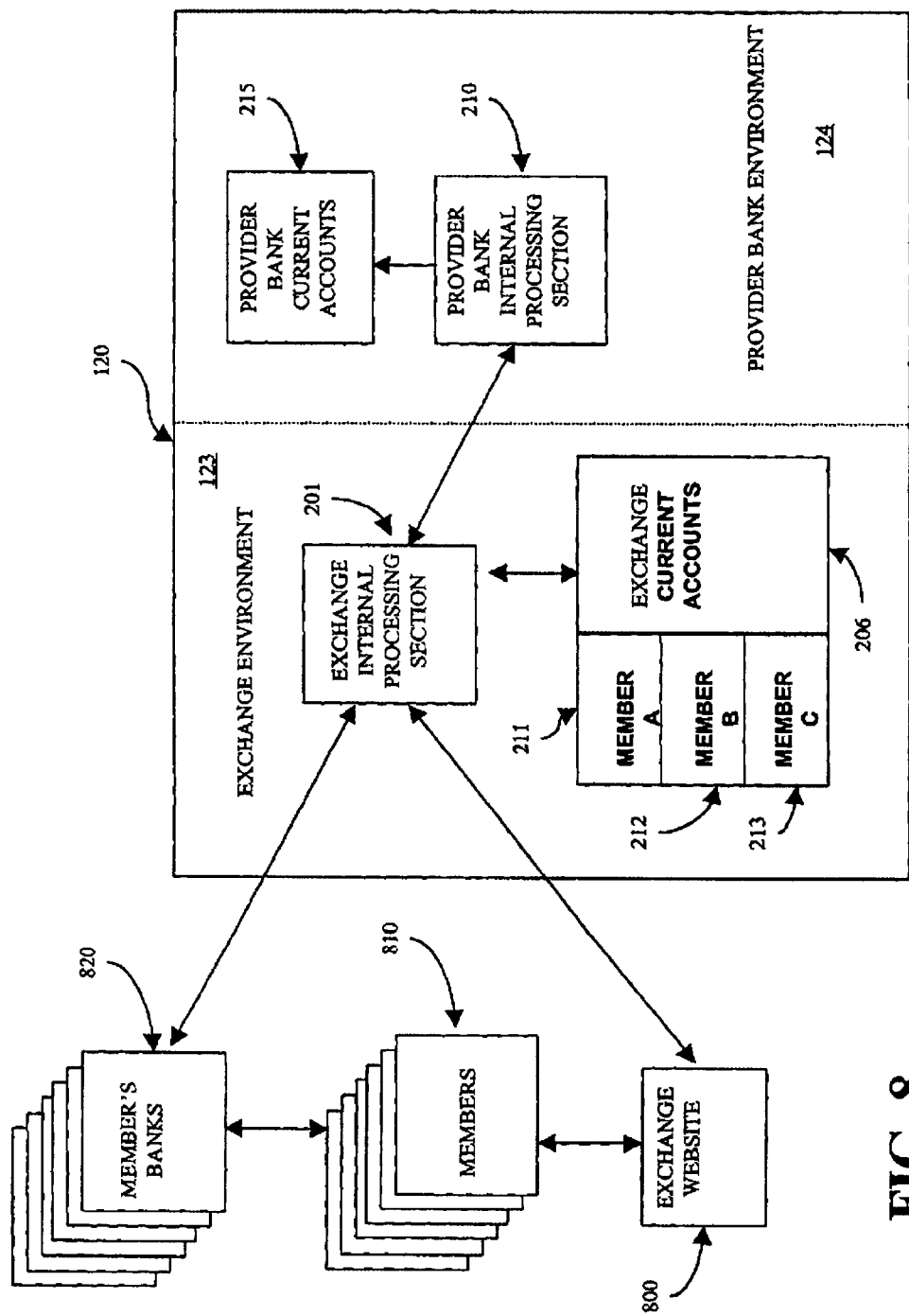
FIG. 8 depicts a business to business settlement and international banking embodiment of the present invention.

FIG. 8 illustrates an alternative embodiment of the present invention for use with a business-to-business (B2B) exchange service. The environment within provider bank 120 is essentially the same as depicted with respect to FIGS. 2, 5 and 6, the difference being that the environment 123 is an environment for the exchange as opposed to an environment for the client bank. The exchange current accounts 206 includes an account (211-213) for each of the members 810 of the exchange. In a preferred embodiment, a membership in the exchange requires a settlement account (211-213) to be held with the exchange.

In operation, the members 810 go to the exchange website 800 in order to initiate and to conclude a transaction. A buying member is able to view an invoice for the transaction on the exchange website 800. Through a link on the website 800 the member 810 is able to contact his own bank 820 in order to instruct his bank to pay proceeds to the provider bank 120 for the account of the exchange for credit to the seller's account (211-213) with the exchange.

The provider bank 120 upon receipt of the payment instruction sends an advice of credit to the seller via a secure postmarked e-mail. The seller can then log onto the exchange website 800 and using a link on the website 800 can access the provider bank 120 and instruct the exchange internal processing section 201 to pay the proceeds via its account at Chase (211-213) to the seller's bank 820 for the seller's account or to any bank designated for any account designated.

As discussed above, this embodiment of the present invention allows any B2B website to safely and securely provide settlement services to its members without the significant and extensive costs of building an infrastructure for performing such settlement services. Furthermore, as discussed above, the present invention is able to provide foreign services as well as international banking services as required by the members of the exchange (e.g., payments and/or credits to and/or from foreign countries).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system by which a provider bank performs lockbox processing for a plurality of customers of a client bank, the system comprising:
    a central delivery point for receiving lockbox receipts on behalf of the plurality of customers of the client bank;
    a provider bank environment established within the provider bank, the provider bank environment comprising:
        a lockbox processing system, the lockbox processing system receiving the lockbox receipts from the central delivery point and generating credits with respect to the lockbox receipts,
        a provider bank environment processor coupled to the lockbox processing system, the provider bank environment processor receiving the credits from the lockbox processing system; and
    a client bank environment established within the provider bank, the client bank environment comprising:
        a plurality of customer accounts corresponding to the plurality of customers of the client bank, and
        a client bank environment processor coupled to the plurality of customer accounts, coupled to the client bank, and coupled to the provider bank environment processor, the client bank environment processor receiving the credits from the provider bank environment processor and applying the credits to corresponding ones of the plurality of customer accounts, whereby the client bank can offer lockbox processing services to the plurality of customers without having any lockbox processing capability within the client bank.

2. The system as recited in claim 1, further comprising at least one remote delivery point coupled to the central delivery point, wherein at least some of the lockbox receipts are received by the remote delivery point and forwarded to the central delivery point.

3. The system as recited in claim 1, wherein the lockbox processing system sorts the lockbox receipts by a customer account number.

4. The system as recited in claim 1, wherein the lockbox processing system sorts the lockbox receipts by currency.

5. The system as recited in claim 1, wherein the lockbox processing system images the lockbox receipts.

6. The system as recited in claim 1, further comprising a lockbox database coupled to the lockbox processing system, wherein data related to the lockbox receipts generated by the lockbox processing system is stored in the lockbox database.

7. The system as recited in claim 6, wherein the data includes images of the lockbox receipts.

8. The system as recited in claim 6, wherein the data includes financial data related to the lockbox receipts.

9. The system as recited in claim 6, wherein the client bank is coupled to the lockbox database and the client bank can access the data stored in the lockbox database.

10. The system as recited in claim 1, wherein there is a second client bank having a second plurality of customers, the system further comprising:
   a second client bank environment established within the provider bank, the second client bank environment comprising:
      a second plurality of customer accounts corresponding to the second plurality of customers of the second client bank, and
      a second client bank environment processor coupled to the second plurality of customer accounts, coupled to the second client bank and coupled to the provider bank environment processor, wherein the second client bank environment processor and the provider bank environment processor operate to apply the credits to corresponding ones of the second plurality of customer accounts.

11. A method by which a provider bank performs lockbox processing for a plurality of customers of a client bank, the method comprising:
   receiving lockbox receipts on behalf of the plurality of customers of the client bank, the lockbox receipts being received in a central delivery point;
   establishing a provider bank environment within the provider bank, the provider bank environment comprising a lockbox processing system and a provider bank environment processor coupled to the lockbox processing system;
   receiving, at the lockbox processing system, the lockbox receipts from the central delivery point into the client bank environment;
   generating, by the provider bank environment processor, credits with respect to the lockbox receipts,
   establishing the client bank environment within the provider bank, the client bank environment comprising a plurality of customer accounts and a client bank environment processor coupled to the plurality of customer accounts, coupled to the client bank, and coupled to the provider bank environment processor;
   establishing the plurality of customer accounts within the client bank environment, the plurality of customer accounts corresponding to the plurality of customers of the client bank;
   receiving the credits from the provider bank environment into the client bank environment; and
   applying the credits to corresponding ones of the plurality of customer accounts, whereby the client bank can offer lockbox processing services to the plurality of customers without having any lockbox processing capability within the client bank.

* * * * *